Patented Feb. 17, 1925.

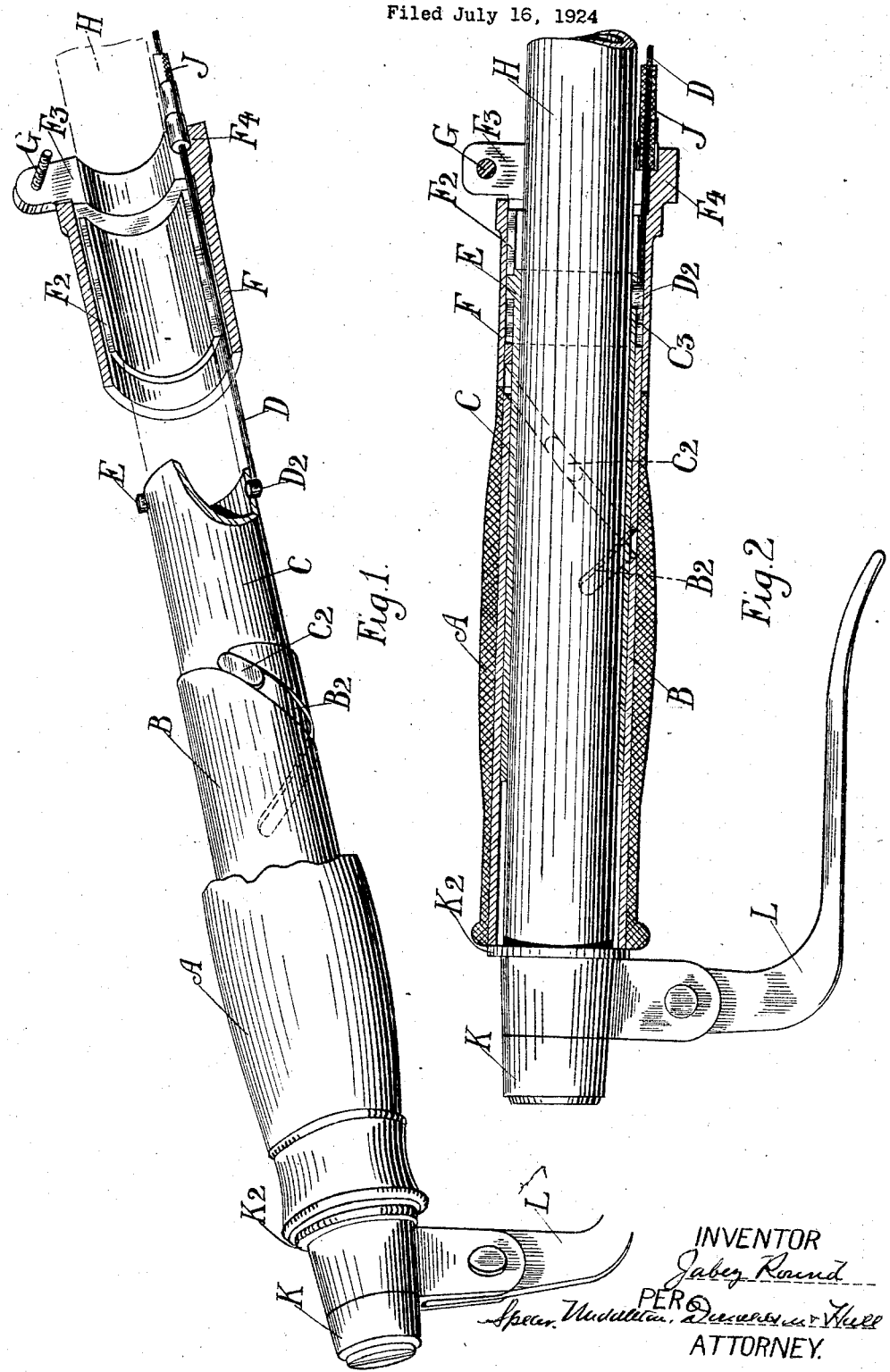

1,526,681

UNITED STATES PATENT OFFICE.

JABEZ ROUND, OF ASTON, BIRMINGHAM, ENGLAND, ASSIGNOR TO A. M. A. C. LIMITED, OF BIRMINGHAM, ENGLAND, A BRITISH COMPANY.

HANDLEBAR-CONTROL MECHANISM FOR USE ON MOTOR CYCLES AND THE LIKE.

Application filed July 16, 1924. Serial No. 726,371.

*To all whom it may concern:*

Be it known that I, JABEZ ROUND, a subject of the King of England, residing at Aston, Birmingham, England, have invented certain new and useful Improvements in Handlebar-Control Mechanism for Use on Motor Cycles and the like, of which the following is a specification.

This invention relates to handlebar control-mechanism for use on motor cycles and the like, of the type in which a twisting grip or handle is employed to actuate a transmission member, such as a Bowden wire mechanism, and it has for its object to provide a neat and simple construction which can be readily applied to existing handlebars without necessitating structural alteration thereof.

According to this invention, the control mechanism comprises the combination of a fixing sleeve which is adapted to be clipped onto the handlebar, a tubular member sliding coaxially with the sleeve and having a non-rotatory and sliding engagement with it, a twisting grip member having a helical driving connection with the tubular member, and a stop carried by the end of the handlebar. The wire of the Bowden mechanism or equivalent is attached to the sliding tubular member and the casing for the wire abuts against the fixing sleeve.

The manner of carrying out the invention is illustrated in the accompanying drawings, in which—

Figure 1 is a perspective view partly sectioned and showing the split sleeve slightly separated from its normal position.

Figure 2 is a longitudinal section showing the mechanism assembled.

Like letters indicate like parts throughout the drawings.

In this construction, a handle or grip A of any convenient type is mounted upon a liner B having a helical slot $B^2$ of suitable proportions. This liner is telescopically arranged upon a tubular member C provided with a pin or key $C^2$ adapted to be engaged by the helical slot $B^2$. The latter is further formed with means for the attachment of the wire of a Bowden mechanism. For example, a recess $C^3$ of key-hole form may be cut in the inner edge for the reception of a corresponding nipple $D^2$ soldered upon the end of the Bowden wire D. A key or feather E is also formed upon, or fixed to, the tubular member C, and this feather engages an axial slot $F^2$ cut in the interior periphery of a sleeve-like member F which is split at one end $F^3$ and provided with a draw bolt G whereby it may be rigidly clipped upon the handlebar H. The outer edge of this fixing sleeve F is also provided with an enlargement $F^4$ which is drilled for the reception of the casing J of a Bowden wire mechanism so as to constitute the stop therefor.

In assembling the mechanism upon a handlebar, the split fixing sleeve F is first slid upon the bar H and secured in a suitable position. Next, the tubular member C is passed over the handlebar and into the sleeve F so that the feather E on the former engages the axial slot in the latter, the Bowden wire D itself having first been engaged with the recess provided in the tubular member.

Next, the liner B carrying the grip is passed over the tubular member so that the helical slot in the former engages the pin or key $C^2$ on the latter. Finally, a suitable stop or abutment is rigidly secured upon the outer end of the handlebar. This stop may be constituted by a plug K having a flange $K^2$, and, if desired, an inverted or other control lever L may be combined with the plug or stop.

It will be seen that in operation the grip and its liner B are free to rotate between the stops F and $K^2$ referred to. In rotating, however, the helical slot $B^2$ will impart an axial sliding movement to the tubular member C located within, and it will be understood that a suitable clearance is left on the interior of the split fixing sleeve to permit of this.

Movement of the tubular member draws upon the Bowden wire D, and, as previously stated, the necessary abutment for the outer casing J is constituted by a recess in the part $F^4$ of the member F. Where the outer stop $K^2$ is combined with a control lever L of the normal type, the wire mechanism for the latter will pass completely through the handlebar and engage the lever in the normal manner.

It will be seen that by this invention a very neat and simple control is provided in which the concentric arrangements of the members avoid the necessity of any protruding parts.

What I claim as my invention and desire to secure by Letters Patent of the United States is:—

1. In a handlebar control mechanism for a motor vehicle, the combination of a sleeve adapted to be secured to the handlebar, a member slidable lengthwise of said sleeve and coaxial therewith and non-rotatable with reference to it, a transmission element connected with said sliding member, a twisting grip control member encircling said handlebar, a helical driving connection between said twisting grip member and said sliding member, and means for preventing endwise movement of said twisting grip member, substantially as set forth.

2. In a handlebar control mechanism for a motor vehicle, the combination of a fixing sleeve adapted to be secured to the handlebar, a tubular member slidably mounted upon said handlebar and having a non-rotating and sliding engagement with said fixing sleeve, a transmission member attached to said tubular member, a stop upon said handlebar, and a twisting grip control member having a helical driving connection with said tubular member located upon said handlebar and engaging said stop, substantially as set forth.

3. In a handlebar control mechanism for a motor vehicle, the combination of a split fixing sleeve adapted to be secured to the handlebar, a longitudinal keyway in said sleeve, a tubular member slidably mounted upon said handlebar, a key in said tubular member engaging said keyway in said sleeve, a transmission cable attached to said tubular member, a casing surrounding said cable, an abutment for said casing in said split fixing sleeve, a stop at the end of said handlebar, and a twisting grip control member having a helical driving connection with said tubular member located upon said handlebar between said fixing sleeve and said stop, substantially as set forth.

4. In a handlebar control mechanism for a motor vehicle, the combination of a split sleeve secured at one end to the handlebar and having at the other end an annular space between it and the handlebar, a tubular member mounted upon the handlebar, one end of which extends into said annular space, a sliding and non-rotatable connection between said tubular member and said sleeve, a transmission element connected with said tubular member, a twisting grip control member mounted upon said tubular member, a helical driving connection comprising a key and an inclined keyway between said tubular member and said twisting grip control, and means for preventing endwise motion of said twisting grip member, substantially as set forth.

In testimony whereof I have signed my name to this specification in the presence of two subscribing witnesses.

JABEZ ROUND.

Witnesses:
JAS. H. WALKER,
SIDNEY HOWELL.